United States Patent [19]

Ahuja

[11] 4,388,501

[45] Jun. 14, 1983

[54] AUDIO-VISUAL LINE TEST TERMINATION DEVICE

[75] Inventor: Omprakash G. Ahuja, East Meadow, N.Y.

[73] Assignee: TII Industries Inc., Copiague, N.Y.

[21] Appl. No.: 262,456

[22] Filed: May 11, 1981
(Under 37 CFR 1.47)

[51] Int. Cl.³ .................. H04B 3/46; H04M 1/26
[52] U.S. Cl. .................. 179/175.3 R; 179/84 L
[58] Field of Search ......... 179/175.3 R, 175, 175.1 R, 179/84 R, 84 L, 84 C, 81 R, 81 C, 91 R, 91 A, 1 PC; 307/237; 324/51, 72.5, 133

[56] References Cited

U.S. PATENT DOCUMENTS

| | | |
|---|---|---|
| 3,600,678 | 8/1971 | Garrett et al. .................. 179/175 X |
| 3,896,270 | 7/1975 | Kopec et al. .................. 179/84 L |
| 3,941,950 | 3/1976 | Dunwoodie et al. ......... 179/175.3 R |
| 3,951,248 | 4/1976 | Feiner et al. .................. 179/175 |
| 3,976,849 | 8/1976 | Champan .................. 179/175.3 R |
| 3,983,338 | 9/1976 | Mathauser .................. 179/175 |
| 4,209,671 | 6/1980 | Charles et al. .................. 179/175 |
| 4,288,660 | 9/1981 | Fasano .................. 179/175 |

Primary Examiner—Thomas A. Robinson
Attorney, Agent, or Firm—Martin Sachs

[57] ABSTRACT

An audio-visual line test termination device for providing a characteristic signature to the telephone central office and a visual and an audible signal to the customer when a continuity test is made on a subscriber line having a pair of electrically conductive paths includes a miniature audio indicator, a light source and a minimum of associated electrical components to indicate to the central office test operator and the customer that the telephone subscriber line is in operating order. The instant invention may be utilized together with a housing that may be permanently installed across the subscriber line.

8 Claims, 7 Drawing Figures

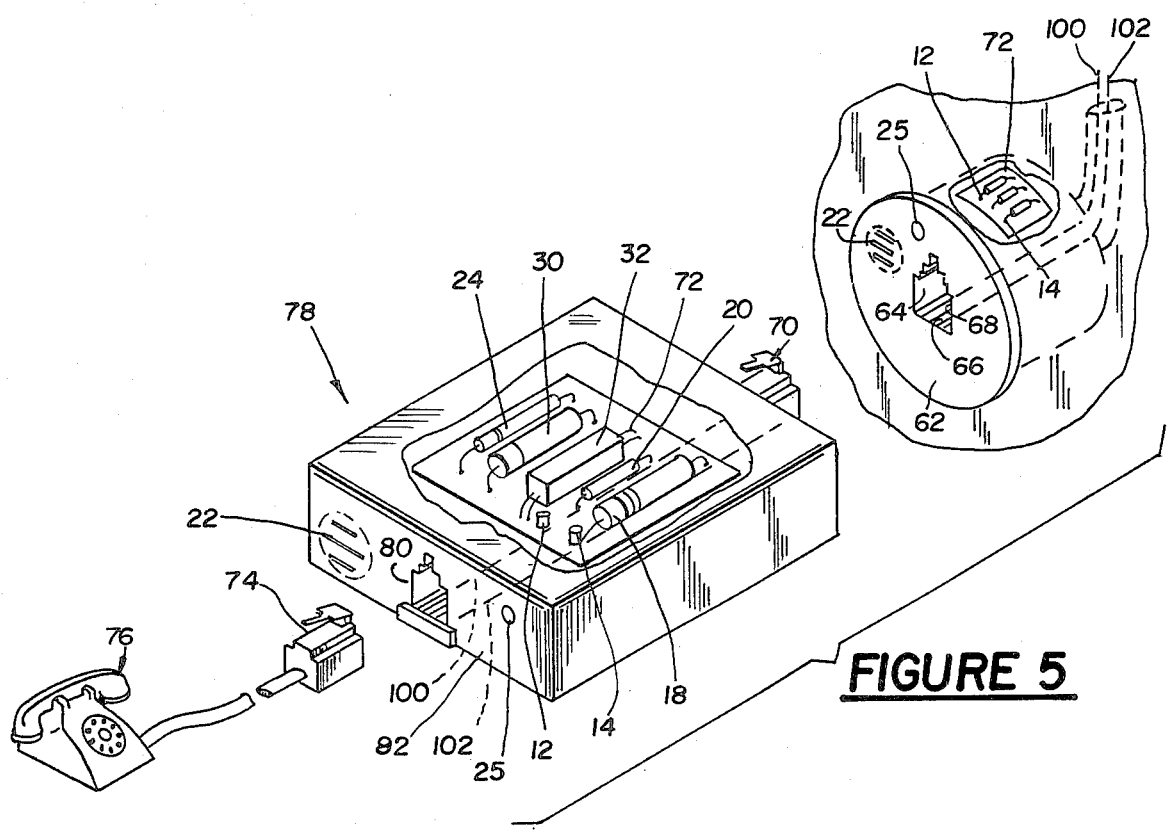
FIGURE 5
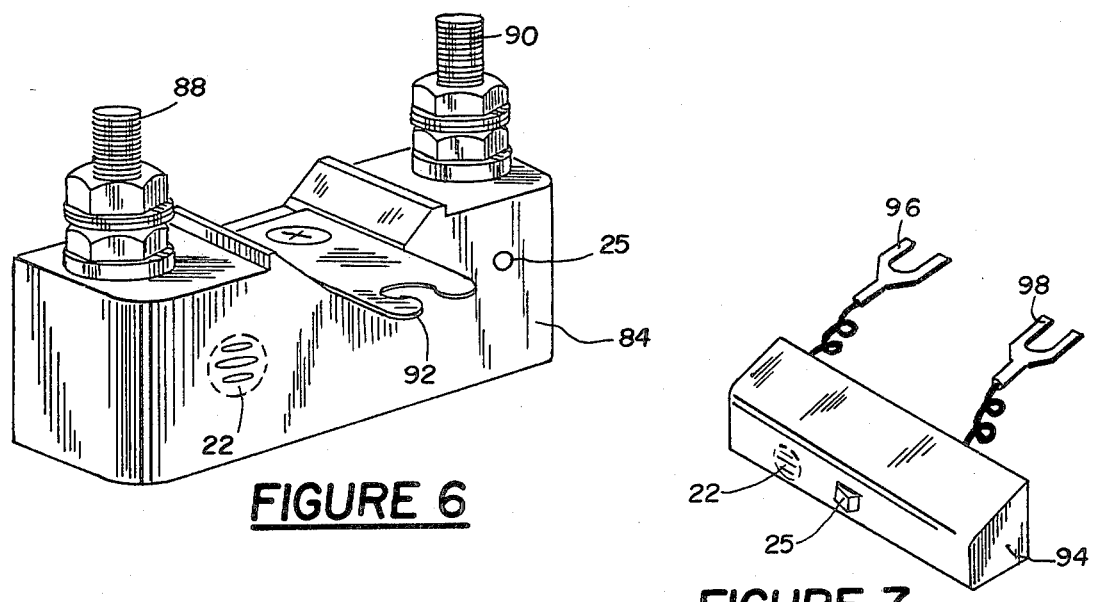
FIGURE 6
FIGURE 7

AUDIO-VISUAL LINE TEST TERMINATION DEVICE

BACKGROUND OF THE INVENTION

1. Field of the Invention

The present invention relates to telephone line test termination devices and, in particular, to a circuit arrangement which provides a unique or characteristic signature to the central office when a continuity test is being made on a subscriber line and provides an audible signal and visual indication to the customer during the test.

2. Discussion of the Relevant Art

Many different types of circuit arrangements have been suggested for use in testing telephone subscriber lines from a remote location. Generally, these circuit arrangements require installation or must be utilized by a telephone installer who must physically visit the premises where the telephone is installed and then signal the central office so that the central office test operator may perform the required test to determine if the subscriber lines are in working order. Many of these circuit arrangements include a switching device and a tuned circuit which is activated from the central office. These components are unreliable and require an installer to enter the home where the telephone is located. This is unsatisfactory for numerous reasons. Generally, the devices are unable to remain permanently at the installed telephone, or if they are capable of being installed permanently, they require activation by an AC signal provided by the central office. None of the devices heretofore are capable of providing a visual indication in addition to an audible signal at the premises where the telephone is installed during the testing of the subscriber lines by the central office test operator. Requiring a telephone installer to enter the customer's premises or requiring activation of the equipment by a superimposed signal from the central office is an unreliable method and therefore is unsatisfactory.

A simple reliable means of providing a characteristic signature or impedance across the subscriber's conducting path, which can provide an audible signal and visual indication to the customer when the test is performed and can provide an indication at the central office that the subscriber line is intact and operable by merely utilizing a DC test voltage, a milliameter and a reversing switch, is an ideal solution to the problem.

SUMMARY OF THE INVENTION

The present invention overcomes the shortcomings of the prior art by providing a simple, inexpensive circuit arrangement that is capable of providing an audible and visual indication at the customer's telephone termination, which may be installed permanently at the customer's telephone or station protector, be installed by the use of a removable plug, or may be provided with the installation of new telephone equipment by providing the instant circuit arrangement in the instrument and/or its associated plug.

Therefore, it is an object of the present invention to provide a simple, inexpensive circuit arrangement that may be connected across a subscriber line to yield a characteristic signature or impedance which may be readily recognized by a central office interrogating the line during a continuity test and provide an audible and visual signal at the subscriber's (customer's) telephone or station protector.

Another object of the present invention is to provide a subscriber termination device which has a characteristic signature and provides an audible and visual indication that may be left across the subscriber line at all times.

It is yet another object of the present invention to provide a reliable termination device for telephone subscriber lines that will yield a characteristic signature, provide an audible and visual indication when the line is being interrogated by the central office and is relatively inexpensive to manufacture.

A varying impedance line test termination device for providing a characteristic signature to the telephone central office and an audio-visual indication at a subscriber termination when a continuity test is being made on a subscriber line having a pair of electrically conductive paths, according to the principles of the present invention, includes a first current path having a first resistor and a first capacitor connected in series. The serially connected first resistor and the first capacitor are connected across the electrically conductive line paths. A diode and a first light emitting voltage breakover means is connected across the capacitor. A second current path has an audio indicating means, a second light emitting voltage breakover means and a light dependent resistor connected in series across the electrically conductive line paths. The light dependent resistor is disposed proximate the first light emitting breakover means to receive light rays emanating therefrom. All the components are housed in a wall mounted connecting device which mates with a connecting device provided on a telephone instrument, or they are mounted within a housing having a connected device on one end which mates with the wall mounted connecting device and has a connecting device on the opposite end that mates with the connecting device provided on the telephone instrument.

The foregoing and other objects and advantages will appear from the description to follow. In the description, reference is made to the accompanying drawing which forms a part hereof, and in which is shown by way of illustration, a number of specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 5 is a pictorial representation, not to scale, of three alternative housings, partially broken away, which may be utilized in the instant invention; and FIGS. 6 and 7 are further alternative housings for the instant invention.

DESCRIPTION OF THE PREFERRED EMBODIMENT

Figure 1:
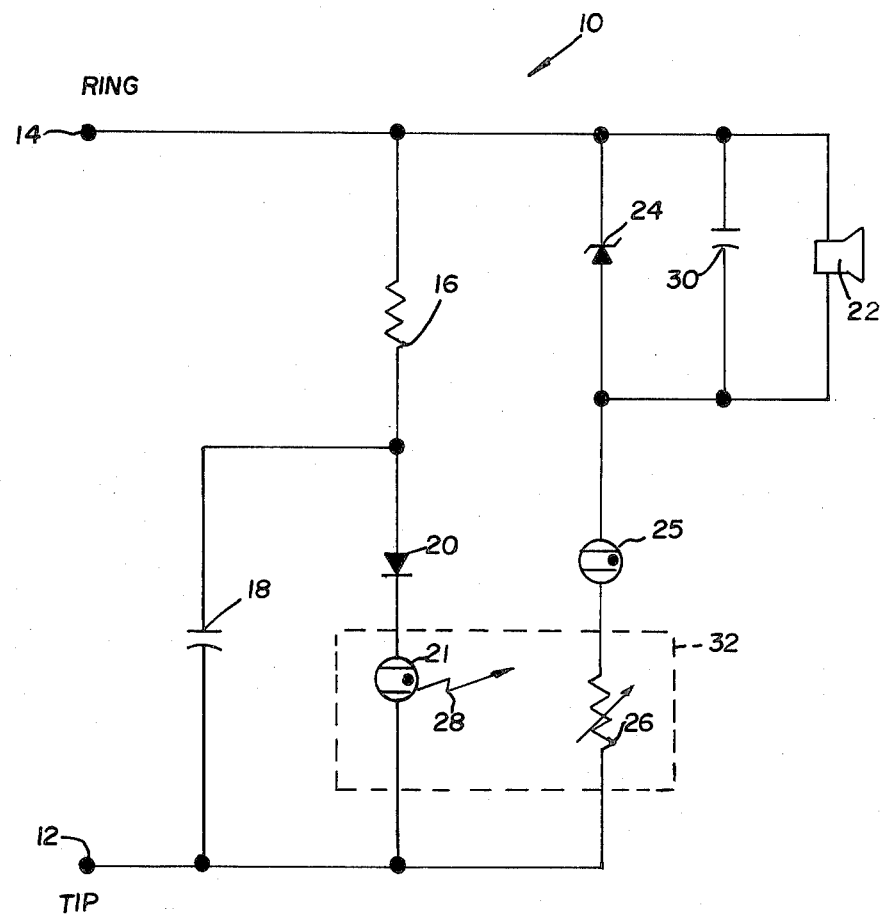
FIG. 1 is a schematic circuit diagram of the preferred embodiment, according to the principles of the present invention.
Figure 2:
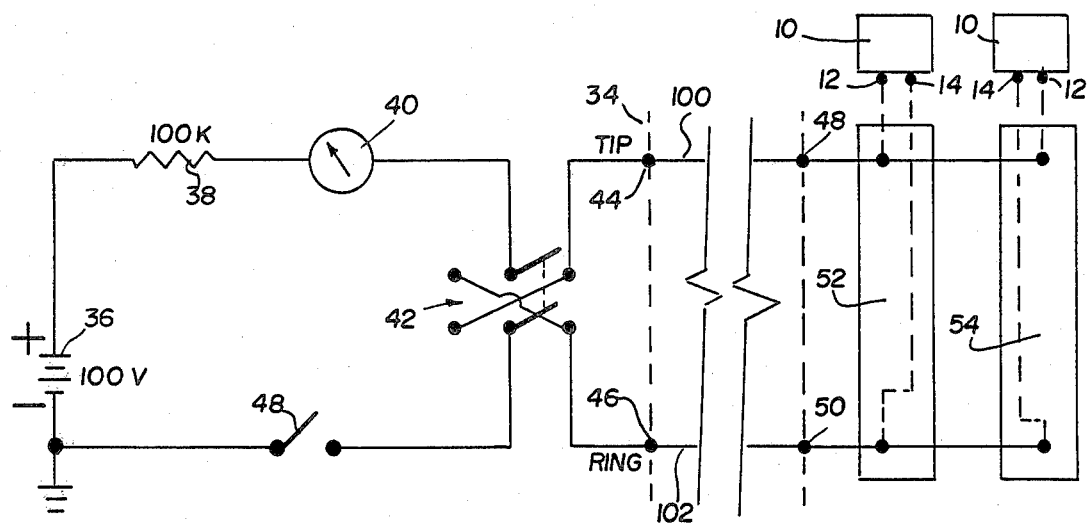
FIG. 2 is a schematic circuit and functional block diagram of the continuity test performed by the central telephone office on a subscriber line.

Referring now to the figures, and in particular, to FIG. 1, there is shown a preferred embodiment 10 of an audio-visual line test termination circuit arrangement, which may be connected across a subscriber line having a pair of electrically conductive paths 100 and 102, as shown in FIG. 2. The tip terminal 12, shown in FIG. 1, is connected to one of the conductive paths 100 while the ring terminal 14 is connected to the other conductive path 102 of the subscriber line providing a series current path therebetween that includes a resistor 16 connected in series with a capacitor 18. A diode 20 connected in series with a light emitting voltage breakover device 21 is connected across, or in parallel with capacitor 18. A second current path is provided between tip terminal 12 and ring terminal 14 and includes an audio indicator means 22, a light emitting voltage breakover means 25, preferably a neon tube, and a light dependent resistor (LDR) 26 connected in a series arrangement. Light dependent resistor 26 is disposed in close proximity with light emitting breakover means 21, preferably a neon tube, in order to effectively receive the light rays 28 emanating therefrom and preferably, is incased in a light tight housing 32 to prevent ambient light from affecting the value of light dependent resistor 26. A voltage breakover device 24, preferably a zener diode, is connected across, in parallel with, audio indicator 22 to limit the voltage thereacross to its safe operating level. In addition, a capacitor 30 may be connected across audio indicator 22 to reduce the current fluctuations being reflected back to the subscriber line because of current variations that occur in audio indicator device 22 when a voltage appears thereacross. As shown in FIG. 1, breakover device or zener diode 24 is poled in the opposite direction than diode 20, which preferably is also of the semiconductor type. The circuit arrangement as shown in FIG. 1 may be connected across a conventional voltage arrester, not shown, or installed across any other device placed across a subscriber line as shown in FIG. 2.

For more detailed discussion as to the housings that may be utilized for the audio-visual line test termination circuit arrangement, reference may be made to FIGS. 5, 6 and 7 which will be discussed hereinafter.

Since diode 20 and breakover device 21 are connected in series, their respective positions are not critical. Likewise, since audio indicator 22, breakover device 25 and the light dependent resistor 26 are connected in series, their position in the series path is not critical. The only requirement is that light dependent resistor 26 is in close proximity to light emitter breakover device 21 in order to enable it to receive the light rays emanating therefrom. If zener diode 24 is to be utilized to protect audio indicator 22 it must be poled in the opposite direction to diode 20 as indicated in FIG. 1.

Figure 4:
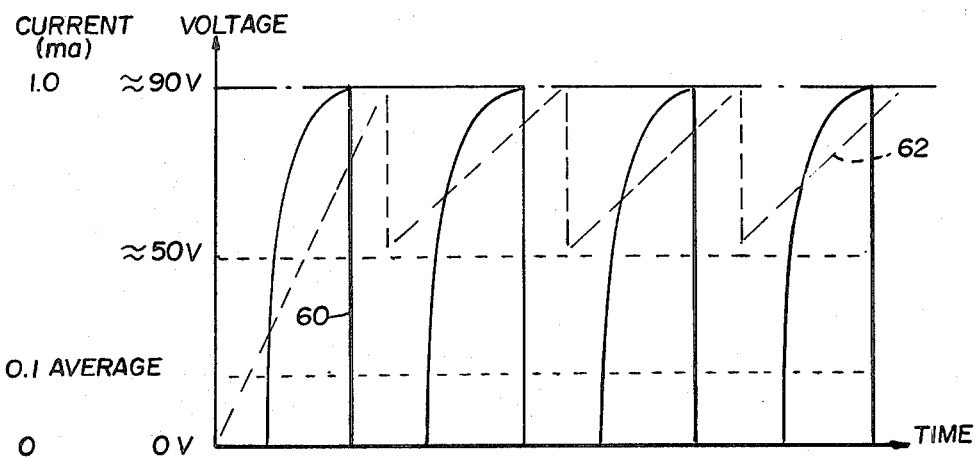
FIG. 4 is a pictorial representation of current versus time showing continuous variations in current on a subscriber line having the instant invention affixed thereacross and the voltage appearing across a charging capacitor, when it is interrogated by the central office.

In operation, a DC voltage is applied across terminals 12 and 14 by the central office test operator when he interrogates the subscriber line to determine its continuity. The operation of this test and interrogation circuitry will be explained in conjunction with FIG. 2. However, it is to be noted that a positive voltage appearing in terminal 12 with respect to terminal 14 will not permit any current to flow therebetween (excluding leakage currents) because diode 20 is reverse biased and the resistance of LDR 26 is relatively large. When terminal 14 is made positive with respect to terminal 12, the current will be permitted to flow and charge capacitor 18 in an exponential manner until the breakover voltage of the breakover means 21, preferably a neon tube, is reached. Once the breakover voltage is reached capacitor 18 will discharge through diode 20 causing the neon tube 21 to radiate light rays 28. The light rays will be extinguished when the voltage across capacitor 18 drops below the extinguishing or turn-off voltage point of the neon tube 21. The dotted curve 62 shown in FIG. 4, shows the voltage appearing across capacitor 18 during the time a positive interrogation or test voltage appears on terminal 14 with respect to terminal 12. The current flowing through the audio indicator 22 is essentially zero until the light rays 28 reaching LDR 26 cause it to assume a relatively low resistance. Once the LDR becomes a relatively low resistance the test voltage, being approximately 100 volts DC, will cause the neon tube device 25 to break down permitting current to flow through the audio indicator 22, through neon tube 25 and the LDR 26. Current flowing into the audio indicator 22 will cause it to radiate an audible sound of approximately 4 K Hz. The current through the audio indicator 22 is shown at curve 60, in FIG. 4. Capacitor 30 prevents these current pulses from being injected into the subscriber line reducing the possibility of interference with other subscriber circuits. The current meter utilized at the central office test station, therefore, will not vary in accordance with the current shown, since the capacitor 30 provides filtering and the meter used to read the test current is incapable of responding to these frequencies. A current change shown on the central office test station meter with reverse polarity of the test voltage indicates to the test operator that the subscriber's line (electrically conductive paths 100 and 102) are intact and suitable for use.

Preferably, resistor 16 is approximately 1 Megohm, capacitor 18 is 1 microfarad, zener diode 24 has a breakover voltage of approximately 10 volts, and capacitor 30 is 0.1 microfarad The audio indicator 22 suitable for this application is Model No. AL-250 manufactured by Projects Unlimited, Inc., of Dayton, OH 45414.

FIG. 2 discloses a test circuit arrangement utilized by the telephone central office to interrogate a subscriber line in order to determine if the line is in operating order and is not broken or open somewhere between the central office and the subscriber's home. All the items shown to the left of broken line 34 are generally located at the telephone central office at the test station and include a DC voltage source 36 (approximately 100 volts) which has a series current limiting resistor 38 of approximately 100,000 ohms connected in series with a milliammeter 40 and a polarity reversing voltage switch 42 connected to terminals 44 and 46, and a switch 48 which is also included to complete the test circuit path. The subscriber telephone lines 100 and 102 are connected to terminals 44 and 46, respectively, at the central office and are connected to terminals 48 and 50 respectively, at the subscriber's end where the telephone instruments 52 and 54 are to be installed. Any number of telephone instruments 52, 54 may be connected in parallel, in a conventional manner. Each of the telephone instrument terminations may include an audible line test termination device 10 connected across the instrument conductive wires as shown therein, thereby providing the characteristic signature of a low impedance in one direction and a high impedance in the other direction (with a reversal of polarity). The audible line test termination device 10 may be incorporated in a housing which may be readily installed into a receptacle presently in use by the telephone company. The housing may also provide a means for accepting a telephone instrument plug so that it may be left in position permanently.

With the present utilization of telephone plugs and jacks by the telephone companies, the instant invention is ideally suited for use therewith, since when the telephone subscriber is permitted to install his own telephone instrument, the telephone line must be checked by the central office in order to determine its suitability for use. These tests, which are made by the central office test operator, determine if the subscriber line is open, shorted, grounded or has a foreign battery on it. Without a telephone set and its associated ringer connected to the line, the test for continuity (open circuit) cannot be reliably made unless telephone personnel are dispatched to the customer's location to assist in performing the test.

With the instant invention, this shortcoming is overcome. The central office may now check the subscriber line where an audio-visual line test termination device has been installed and with the cooperation of the customer, the test is further verified by providing an audible and visual signal. The central office test desk makes the loop continuity test by accessing the subscriber line in the conventional manner and operating the ground key (switch 48) on the test board. Switch 48 applies 100 volts DC in series with 100k ohm resistor 38 through the tip side of the subscriber's line and provides a ground to the ring side of the line. By operating the reverse key or switch 42, these connections are changed so that the voltage is applied to the ring side of the subscriber line and the ground is applied to the tip side of the subscriber line.

A good subscriber line without an audible station termination device 10 connected to it will cause a test board meter 40 to read zero (except that a brief meter "kick" will be observed while the ringing capacitor charges if it is connected to the line during this test). Operating the reverse key (switch 42) while keeping the ground key (switch 48) closed will also produce the same effect. If no ringer is connected, it cannot be determined from the 0 meter reading if the line has continuity to the station protector or to the telephone jack at the subscriber location. If a short circuit exists anywhere along the tip or ring conductors of the line, the meter reading would be somewhere between 0 and 100 and would not change when the reverse swith 42 is operated.

Figure 3:
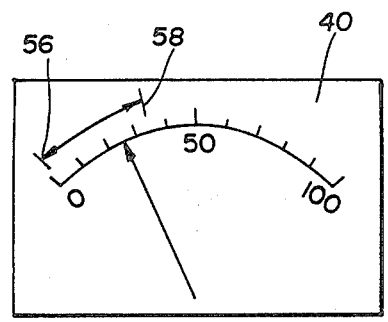
FIG. 3 is a pictorial representation of a meter face at the central office when interrogation of a subscriber line is made.

If an audio-visual line test termination device as disclosed hereinabove is installed at the subscriber location, the telephone office test desk meter 40 shown enlarged in FIG. 3, will indicate zero (56) on a good or open line when the positive voltage is applied to the tip side of the line (terminal 44) as when switch 42 is in the right-hand position shown in FIG. 2. By moving switch 42 to the left-hand position as shown in FIG. 2, the positive voltage from the DC test source 36 will be applied to the ring side of the line (terminal 46) and the meter will assume some value between 0 and 100 (58), depending on the distance the termination is located from the central office test station. The current through the audio indicator 22 will vary at a rate somewhere between 3 and 5K Hz depending upon the actual voltage available thereacross. The rapid change of current through the audio indicator will not be apparent at the meter 40 because the percentage variation in current compared to the total current being fed to the lines is small, capacitor 30 will filter or smooth it out, and the meter 40 is not capable of responding to varations occurring in this frequency range. Therefore, the meter will assume an average value and remain thereat.

Since the preferred embodiment utilizes a capacitor 18 the test circuit operator will see the current variation in the meter when the polarity is reversed and will always see the "kick" caused by capacitor 18 since it is always across the line. With the preferred embodiment as disclosed in FIG. 1, superimposing an AC voltage upon the normal DC (48 volts) appearing on the subscriber line will not provide a sufficiently high DC voltage, when rectified by diode 20 to breakover neon tube 21, because capacitor 18 is a relatively low impedance to the AC ringing voltage. Thus, audio indicator 22 would not operate and would not provide an audio output signal for the customer. Therefore, the only time an audio output is obtainable from the preferred embodiment is when the subscriber line is undergoing a test by the test operator at the central office.

FIG. 5, shown with enlarged portions, discloses a plurality of housings for the audio-visual line test termination device 10 which is capable of providing the characteristic signature to the telephone central office, now shown, when a continuity test is made on a subscriber's telephone line generally consisting of a pair of electrically conductive wires 100 and 102, which are connected to the telephone central office. The wires 100 and 102 are terminated by the telephone company in a wall socket 62 which provides electrically conductive contacts 64 and 66 onto which wires 100 and 102 are affixed, in a conventional manner. The wall socket 62 is provided with an aperture 68 having an irregular shape which is adapted to mate with a male plug 70 that is provided with electrically conductive contacts, not shown, that cooperate with contacts 64 and 66 of receptacle 62, thereby continuing the electrically conducting path therethrough. The wires (electrically conductive paths) 100 and 102 have connected thereacross a series current path including a resistor 16, having a value of approximately 1 megohm and a capacitor 18 of approximately 1 microfarad. Diode 20 and neon tube 21 are connected in series and are connected across capacitor 18. A second current path includes audio indicator 22, neon tube 25 and LDR 26 as stated earlier. Preferably these components are connected across terminals 12 and 14 and are mounted on a miniature printed circuit board 72 which has thereon terminals 12 and 4. Terminals 12 and 14 are connected across the conductive wires 100 and 102 and may be affixed there permanently. The circuit arrangement will thus, provide a characteristic signature when a telephone line cord plug 74, that is normally provided on a telephone set 76, is inserted into aperture 68 or omitted therefrom.

In an alternative embodiment, the line cord plug 74 appearing on instrument 76 may be provided in housing 78, which includes a plug 70 provided at one end and is provided with a receptacle or socket 80 adapted to receive telephone line plug 74 therein to continue the electrical conductive paths formed by wires 100 and 102 which are continued through plug 70 to the contact area of receptacle 80. The circuit arrangement, as disclosed in FIG. 1, may be included on a printed circuit board 72 and connected across conductive paths 100 and 102 in the same manner as that disclosed for socket 62. The audio indicator 22 and neon tube 25 may be mounted in the end surface 72 of housing 78, so that audio and visual indication may be readily radiated into the room where the interrogation of the subscriber line up to and including, the housing 78 is made by the telephone central office. Thus, the circuit arrangement may be installed in a separate housing 78 or in a wall socket 72. Moreover, it may be even more convenient for the telephone company to install the preferred circuit arrangement in the telephone set 76 with the audio indicator 22 and neon tube 25, either provided in the telephone itself, or in its associated line cord plug.

Yet another embodiment of a housing suitable for any of the circuit arrangements disclosed hereinbefore is shown in FIG. 6. Housing 84 may include a two or three-electrode gas tube arrester, a fail-short device, a back-up air gap device, not shown, known as TII-355 and TII-356 manufactured by TII Industries, Inc. of Copiague, NY, the neon tube 25 and the audio indicator device 22 mounted in the housing as shown in FIGS. 6 and 7. The housing shown in FIG. 6 includes terminals 88 and 90 and a ground lug 92. Terminals 88 and 90 are readily wired across the subscriber telephone line 100 and 102 at some point where the subscriber line comes into the residence. It is suitable for both indoor and outdoor installations and may be provided in a housing, not shown, wherein a plurality of housings 84 may be conveniently installed. Of course, ground lug 92 is connected to earth ground, in a conventional manner, to provide a path for any over voltage or lightning strike. The embodiment disclosed in FIG. 7 includes a housing 94 which has extending therefrom a pair of spade lugs 96 and 98 which may be wired across the subscriber line 100 and 102 at any convenient point. An audio-visual indication of interrogation by the central office is provided by the audio indicator 22 and the neon tube 25 mounted on the top surface of housing 94.

Hereinbefore has been disclosed an audio-visual line test termination device and circuit arrangement therefor which is inexpensive to manufacture and is readily incorporated into presently existing telephone line cords, plugs and jacks. It will be understood that various changes in the details, materials, arrangement of parts and operating conditions which have been herein described and illustrated in order to explain the results of the invention may be made by those skilled in the art within the principles and scope of the present invention.

Having thus set set forth the nature of the invention, what is claimed is:

1. A varying impedance line test termination device for providing a characteristic signature to the telephone central office and an audio-visual indication at a subscriber termination when a continuity test is made on a subscriber line having a pair of electrically conductive paths comprising:

(a) a first current path having a first resistor and a first capacitor connected in series, said serially connected first resistor and said first capacitor being connected across said electrically conductive line paths;

(b) a diode and a first light emitting voltage breakover means connected in series, said serially connected diode and said first light emitting voltage breakover means being connected across said capacitor; and (c) a second current path having an audio indicator means, a second light emitting voltage breakover means and a light dependent resistor being disposed proximate said first light emitting breakover means to receive light rays emanating therefrom, said audio indicator means, and said second light emitting voltage breakover means being connected in series across said electrically conductive line paths.

2. A varying impedance line test termination device according to claim 1 wherein said light emitting breakover means are neon tubes.

3. A varying impedance line test termination device according to claim 1 further including a second capacitor connected across said audio indicator.

4. A varying impedance line test termination device according to claim 1 further including a third breakover means connected across said audio indicator means to limit the voltage thereacross to its safe operating level.

5. A varying impedance line test termination device according to claim 4 wherein said third breakover means is a zener diode, said zener diode being poled opposite to said diode.

6. A varying impedance line test termination device according to claims 1, 2, 3, 4 or 5 further including a housing, said housing having connecting means for connecting said first and second current paths between said pair of electrically conductive line paths.

7. A varying impedance line test termination device according to claims 1, 2, 3, 4 or 5 further including a housing, said housing including input and output connecting means for continuing said electrically conductive paths, said input connecting means being adapted to receive a mating connector means provided on a telephone instrument and continue said electrically conductive paths through said mating connector means, said output connecting means being adapted to be received by a wall receptacle having therein said electrically conductive paths extending to said telephone central office, said housing having said resistance means, said diode means, said voltage breakover means and said audio indicator means disposed therein.

8. A varying impedance line test termination device according to claims 1, 2, 3, 4 or 5 further including a housing, said housing including connecting means for continuing said electrically conductive paths from said telephone central office, said connecting means being adapted to receive a mating connector means provided on a telephone instrument and continue said mating connector means to said telephone instrument, said housing having said resistance means, said diode means, said voltage breakover means, and said audio indicator means disposed therein.

* * * * *